United States Patent
Flamini et al.

(10) Patent No.: US 9,948,631 B2
(45) Date of Patent: Apr. 17, 2018

(54) IMPLEMENTING SINGLE SIGN-ON IN A TRANSACTION PROCESSING SYSTEM

(71) Applicant: International Business Machines Corporation, Armonk, NY (US)

(72) Inventors: Elisabetta Flamini, Romsey (GB); Colin R. Penfold, Hants (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 192 days.

(21) Appl. No.: 14/618,867

(22) Filed: Feb. 10, 2015

(65) Prior Publication Data
US 2015/0244705 A1 Aug. 27, 2015

(30) Foreign Application Priority Data
Feb. 21, 2014 (GB) .................................. 1403065.4

(51) Int. Cl.
H04L 29/06 (2006.01)
G06F 21/41 (2013.01)
H04L 29/08 (2006.01)

(52) U.S. Cl.
CPC .......... *H04L 63/0815* (2013.01); *G06F 21/41* (2013.01); *H04L 29/08702* (2013.01); *H04L 63/04* (2013.01); *H04L 63/0807* (2013.01); *H04L 63/166* (2013.01); *G06F 2221/2137* (2013.01)

(58) Field of Classification Search
CPC ..... H04L 63/0815; H04L 63/04; H04L 63/16; H04L 63/166; G06F 17/30864; G06F 21/41
See application file for complete search history.

(56) References Cited

U.S. PATENT DOCUMENTS

| 7,634,803 | B2 * | 12/2009 | Birk ................... H04L 63/0281 713/171 |
| 8,745,718 | B1 * | 6/2014 | Dufel ................. H04L 63/0807 713/155 |
| 8,813,206 | B2 * | 8/2014 | Wu ..................... H04L 63/0815 726/8 |

(Continued)

FOREIGN PATENT DOCUMENTS

WO 2012142370 A2 10/2012

OTHER PUBLICATIONS

Intellectual Property Office—United Kingdom, Search Report for GB Application No. GB1403065.4, dated Aug. 21, 2014, pp. 1-4, Newport, South Wales, UK.

(Continued)

*Primary Examiner* — Linglan Edwards
(74) *Attorney, Agent, or Firm* — Lee Law, PLLC; Christopher B. Lee

(57) ABSTRACT

A single sign-on is implemented in an online transaction processing system. A security token extracted from a transaction request is received. The security token is validated and, in response to a positive validation, security information is extracted. The security information is processed to validate the transaction request and a set of validation attributes is generated. The set of validation attributes is stored in a read-only data object. A transaction server is notified of the read-only data object to authorize processing of the transaction request by the transaction server.

25 Claims, 9 Drawing Sheets

(56) References Cited

U.S. PATENT DOCUMENTS

| | | | | |
|---|---|---|---|---|
| 8,880,889 | B1* | 11/2014 | Ward | H04L 63/0442 |
| | | | | 705/67 |
| 9,264,426 | B2* | 2/2016 | Buer | H04L 9/3234 |
| 2003/0188193 | A1 | 10/2003 | Venkataramappa | |
| 2005/0097060 | A1 | 5/2005 | Lee et al. | |
| 2006/0021016 | A1* | 1/2006 | Birk | H04L 63/08 |
| | | | | 726/10 |
| 2006/0085853 | A1* | 4/2006 | Simpson | G06F 21/10 |
| | | | | 726/22 |
| 2006/0129546 | A1* | 6/2006 | Braun | G06F 9/5055 |
| 2007/0258465 | A1* | 11/2007 | Ma | H04W 28/08 |
| | | | | 370/395.53 |
| 2011/0093937 | A1* | 4/2011 | Mantle | G06F 21/6218 |
| | | | | 726/6 |
| 2014/0020078 | A1* | 1/2014 | Canning | H04L 63/0815 |
| | | | | 726/8 |
| 2014/0095881 | A1* | 4/2014 | Chan | G06F 17/30085 |
| | | | | 713/171 |
| 2014/0206411 | A1* | 7/2014 | Ruutu | H04W 64/00 |
| | | | | 455/522 |
| 2014/0214914 | A1* | 7/2014 | Alex | G06F 9/5033 |
| | | | | 709/201 |

OTHER PUBLICATIONS

Phillip Hallam-Baker, Security Assertions Markup Language: Core Assertion Architecture—Examples and Explanations, May 14, 2001, pp. 1-24, Version 0.7, Verisign, Published online at: https://d9db56472fd41226d193-1e5e0d4b7948acaf6080b0dce0b35ed5.ssl.cf1.rackcdn.com/committees/security/docs/draft-sstc-core-phill-07.pdf.

* cited by examiner

IMPLEMENTING SINGLE SIGN-ON IN A TRANSACTION PROCESSING SYSTEM

BACKGROUND

The invention relates to the field of online transaction processing. In particular, the present invention relates to implementing single sign-on in an online transaction processing system.

Computer systems are used for many different purposes in business today. These range from keeping personal to-do lists to developing business-critical applications in banks.

Applications are often characterized by their purpose, for example, personal productivity, design and development, business intelligence and business operations. Business operations applications are applications that perform transactions on behalf of a company. Such transactions may be credit card transactions, cash transactions from a bank's automatic teller machine, stock market transactions, information processing transactions and payroll transactions to name but a few.

BRIEF SUMMARY

Viewed from a first aspect, the present invention provides a method for implementing single sign-on in a transaction processing system, the method including: receiving a security token extracted from a transaction request; validating the security token and, in response to a positive validation, extracting security information; processing the security information to validate the transaction request and generating a set of validation attributes; storing the set of validation attributes in a read-only data object; and notifying a transaction server of the read-only data object for authorizing processing of the transaction request by the transaction server.

Preferably, the present invention provides a method where notifying the transaction server of the read-only data object for authorizing the processing of the transaction request includes transmitting the read-only data object to the transaction server by a secure transaction channel.

Preferably, the present invention provides a method where the secure transaction channel implements a secure network protocol.

Preferably, the present invention provides a method where notifying the transaction server of the read-only data object for authorizing the processing of the transaction request includes transmitting a pointer to a shared area of memory for accessing the read-only data object by the transaction server.

Preferably, the present invention provides a method where notifying the transaction server of the read-only data object for authorizing the processing of the transaction request includes determining if a secure transaction channel exists and in response to a negative determination, creating the secure transaction channel for transmitting the read-only data object or passing a pointer to an address of the read-only data object to the transaction server.

Preferably, the present invention provides a method that further includes caching the read-only data object in a secure cache.

Preferably, the present invention provides a method where the read-only data object is assigned a time period in which the read-only data object is valid within the secure cache.

Preferably, the present invention provides a method where the time period is configurable.

Preferably, the present invention provides a method where the security token is a security assertion markup language (SAML) token.

Viewed from another aspect, the present invention provides an apparatus for implementing single sign-on in a transaction processing system, the system including: a receiving component for receiving a security token extracted from a transaction request; a validating component for validating the security token and, in response to a positive validation, extracting security information; the validating component processing the security information to validate the transaction request and generating a set of validation attributes; the validating component storing the set of validation attributes in a read-only data object; and the validating component notifying a transaction server of the read-only data object for authorizing the processing of the transaction request by the transaction server.

Preferably, the present invention provides an apparatus where the validating component notifying the transaction server of the read-only data object for authorizing the processing of the transaction request includes transmitting the read-only data object to the transaction server by a secure transaction channel.

Preferably, the present invention provides an apparatus where the secure transaction channel implements a secure network protocol.

Preferably, the present invention provides an apparatus where the validating component notifying the transaction server of the read-only data object for authorizing the processing of the transaction request includes transmitting a pointer to a shared area of memory for accessing the read-only data object by the transaction server.

Preferably, the present invention provides an apparatus where the validating component notifying the transaction server of the read-only data object for authorizing the processing of the transaction request includes determining if a secure transaction channel exists and in response to a negative determination, a creating component creating the secure transaction channel for transmitting the read-only data object or passing a pointer to an address of the read-only data object to the transaction server.

Preferably, the present invention provides an apparatus that further includes a secure cache for storing the read-only data object in the secure cache and the validating component caching the read-only data object in the secure cache.

Preferably, the present invention provides an apparatus further including the validating component assigning the read-only data object a time period in which the read-only data object is valid within the secure cache.

Preferably, the present invention provides an apparatus where the time period is configurable.

Viewed from another aspect, the present invention provides a computer program product including a computer readable storage medium having computer readable program code embodied therewith, where the computer readable storage medium is not a transitory signal per se and where the computer readable program code when executed on a computer causes the computer to, as part of implementing single sign-on in a transaction processing system, perform all the steps of the method as described above.

Viewed from another aspect, the present invention provides a method for implementing single sign-on in a transaction processing system in a cloud computing environment, the method including: receiving a security token extracted from a transaction request; validating the security token and, in response to a positive validation, extracting security information; processing the security information to validate the transaction request and generating a set of validation attributes; storing the set of validation attributes in a read-only data object; and notifying a transaction server of the read-only data object for authorizing the processing of the transaction request by the transaction server.

Advantageously, the present invention provides a means for single sign on between service providers, transaction servers and programs in a federated environment. The present invention provides for a single sign-on with a security token, such as SAML without the need to revalidate the security token.

In order to implement single sign on for the validity of a transaction or the validity of a user's transaction session, the present invention provides for creating read-only data objects of security information and allowing transaction servers and programs to access the read-only data object(s) via a secure transaction channel for sharing trusted information and establishing a trusted relationship among at least two transaction servers in a transaction processing system.

Advantageously, the secure transaction channel enables the sharing of trust information and for establishing a trusting relationship among transaction processing servers. The trust information comprises one or more read-only data objects including the outcome of the validation process (i.e., the attribute data).

Advantageously, the secure cache provides for the single sign-on implementation to extend to a plurality of transactions for the validity time of a security token.

BRIEF DESCRIPTION OF THE SEVERAL VIEWS OF THE DRAWINGS

A preferred embodiment of the present invention will now be described by way of example only, with reference to the accompanying drawings in which.

DETAILED DESCRIPTION

Figure 1:
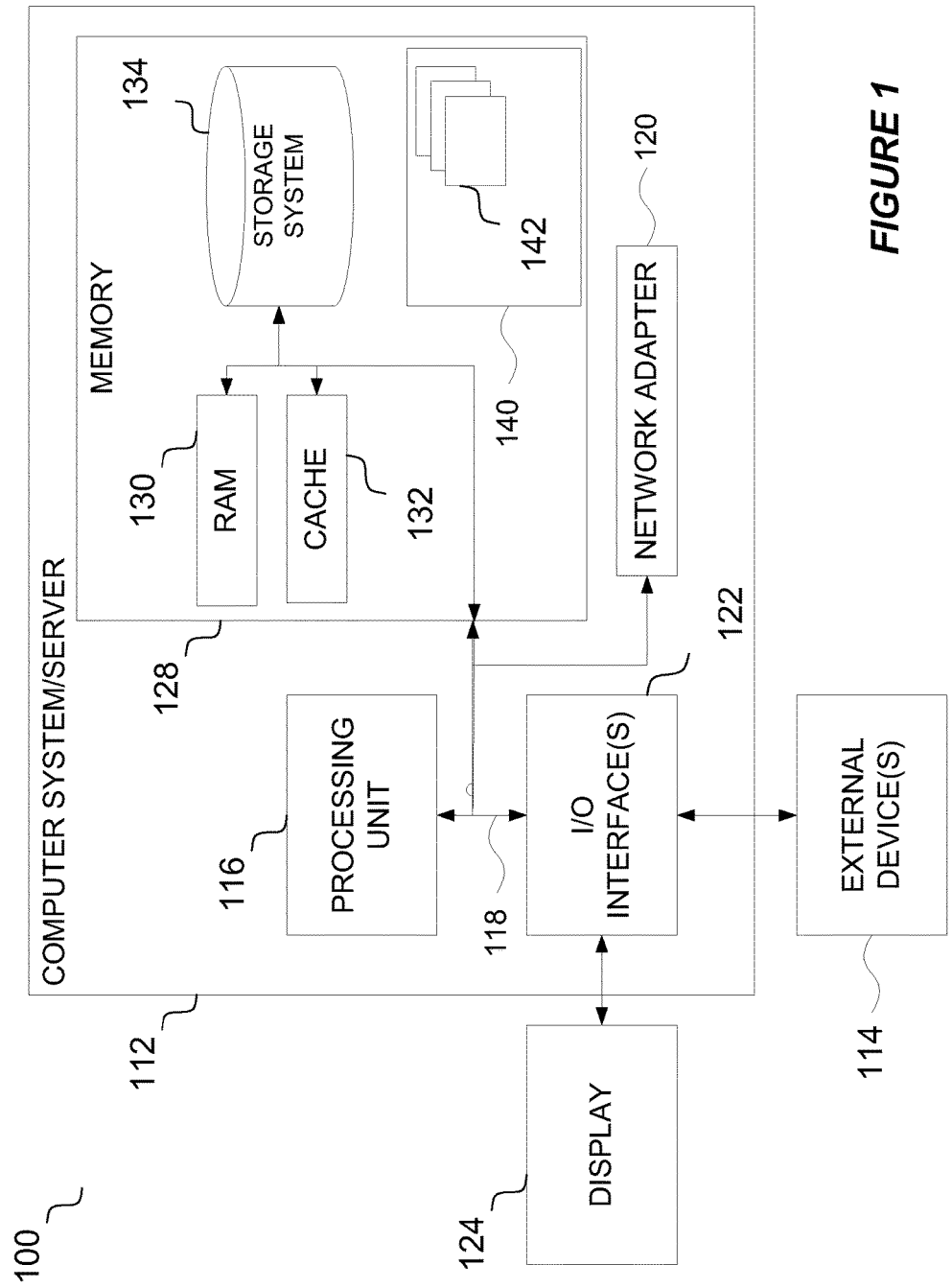
FIG. 1 is a block diagram depicting a cloud computing node.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

It should be noted that conception of the present subject matter resulted from recognition of certain limitations associated with online transaction systems. For example, it was observed that to make the online transaction processing appear seamless to a user, a single sign on (SSO) model is used. This enables a user to sign in to a website using their credentials and the same credentials are then used for accessing protected resources that are required to complete the transaction on another computer platform that may be run by another service provider.

In order to use a single sign on, a user first authenticates with an identity provider. Based on this authentication, and without having to sign in again, the user may access resources provided by one or more service providers. These one or more service providers are in what is known as a federated relationship. Federation refers to an establishment of business agreements, cryptographic trust, and user identifiers or attributes across security and policy domains to enable seamless cross domain business transactions.

It was determined that there is a need to provide a more robust trust relationship between service providers when processing a user's transaction requests, such that transactions may access different services installed on different transaction servers without the user having to re-authenticate at each transaction server. The technology described herein provides a solution to these problems.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 112, which is operational with numerous other general purpose or special purpose computing system environments or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 112 in cloud computing node 100 is shown in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 112 typically includes a variety of computer system readable media. Such media may be any available media that is accessible by computer system/server 112, and it includes both volatile and non-volatile media, removable and non-removable media.

System memory 128 can include computer system readable media in the form of volatile memory, such as random access memory (RAM) 130 and/or cache memory 132. Computer system/server 112 may further include other removable/non-removable, volatile/non-volatile computer system storage media. By way of example only, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces. As will be further depicted and described below, memory 128 may include at least one program product having a set (e.g., at least one) of program modules that are configured to carry out the functions of embodiments of the invention.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of embodiments of the invention as described herein.

Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via Input/Output (I/O) interfaces 122. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to: microcode, device drivers, redundant processing units, external disk drive arrays, RAID systems, tape drives, and data archival storage systems, etc.

Figure 2:
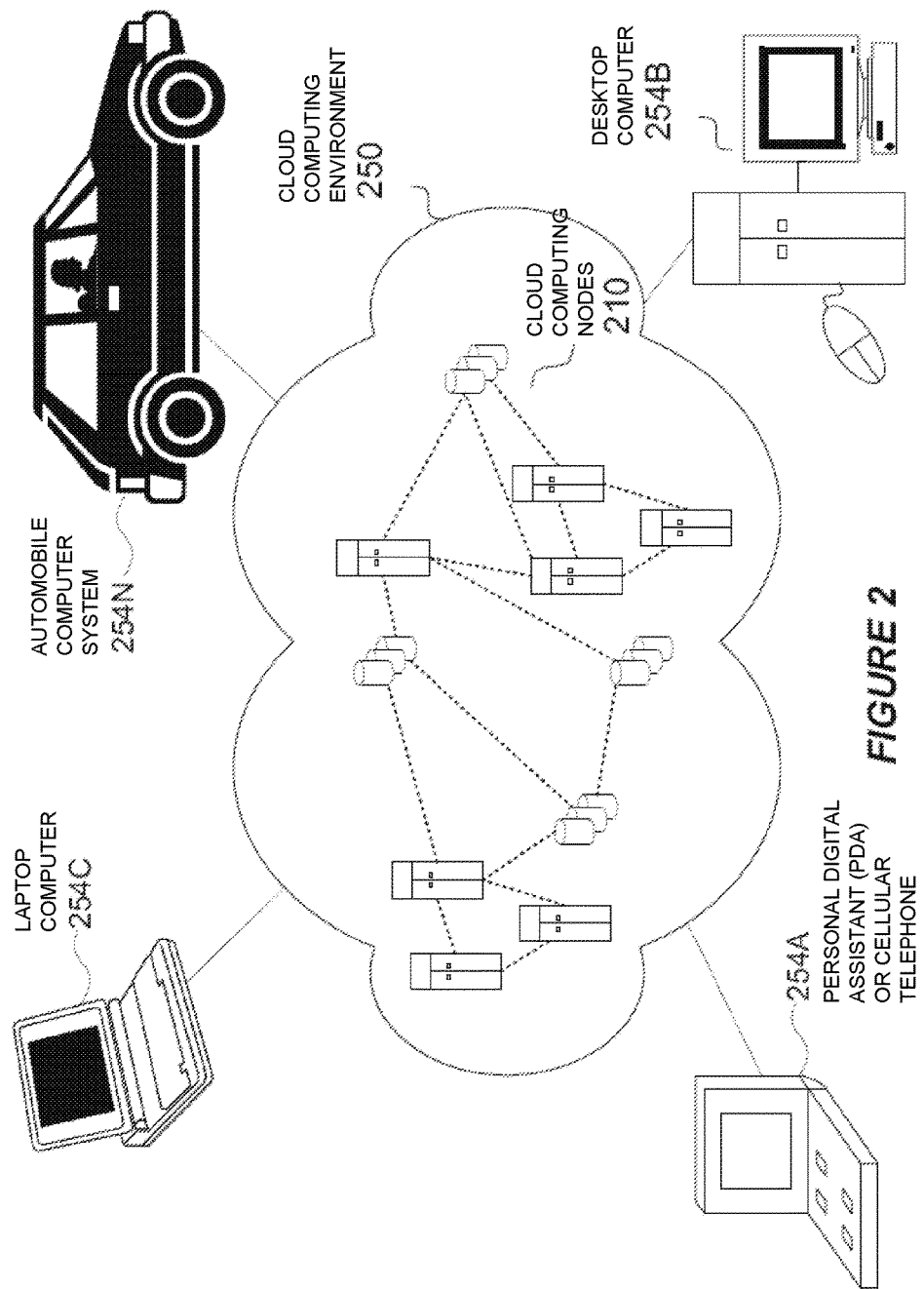
FIG. 2 is a block diagram depicting a cloud computing environment.

Referring now to FIG. 2, illustrative cloud computing environment 250 is depicted. As shown, cloud computing environment 250 comprises one or more cloud computing nodes 210 with which local computing devices used by cloud consumers, such as, for example, personal digital assistant (PDA) or cellular telephone 254A, desktop computer 254B, laptop computer 254C, and/or automobile computer system 254N may communicate. Nodes 210 may communicate with one another. They may be grouped (not shown) physically or virtually, in one or more networks, such as Private, Community, Public, or Hybrid clouds as described hereinabove, or a combination thereof. This allows cloud computing environment 250 to offer infrastructure, platforms and/or software as services for which a cloud consumer does not need to maintain resources on a local computing device. It is understood that the types of computing devices 254A-N shown in FIG. 2 are intended to be illustrative only and that computing nodes 210 and cloud computing environment 250 can communicate with any type of computerized device over any type of network and/or network addressable connection (e.g., using a web browser).

Figure 3:
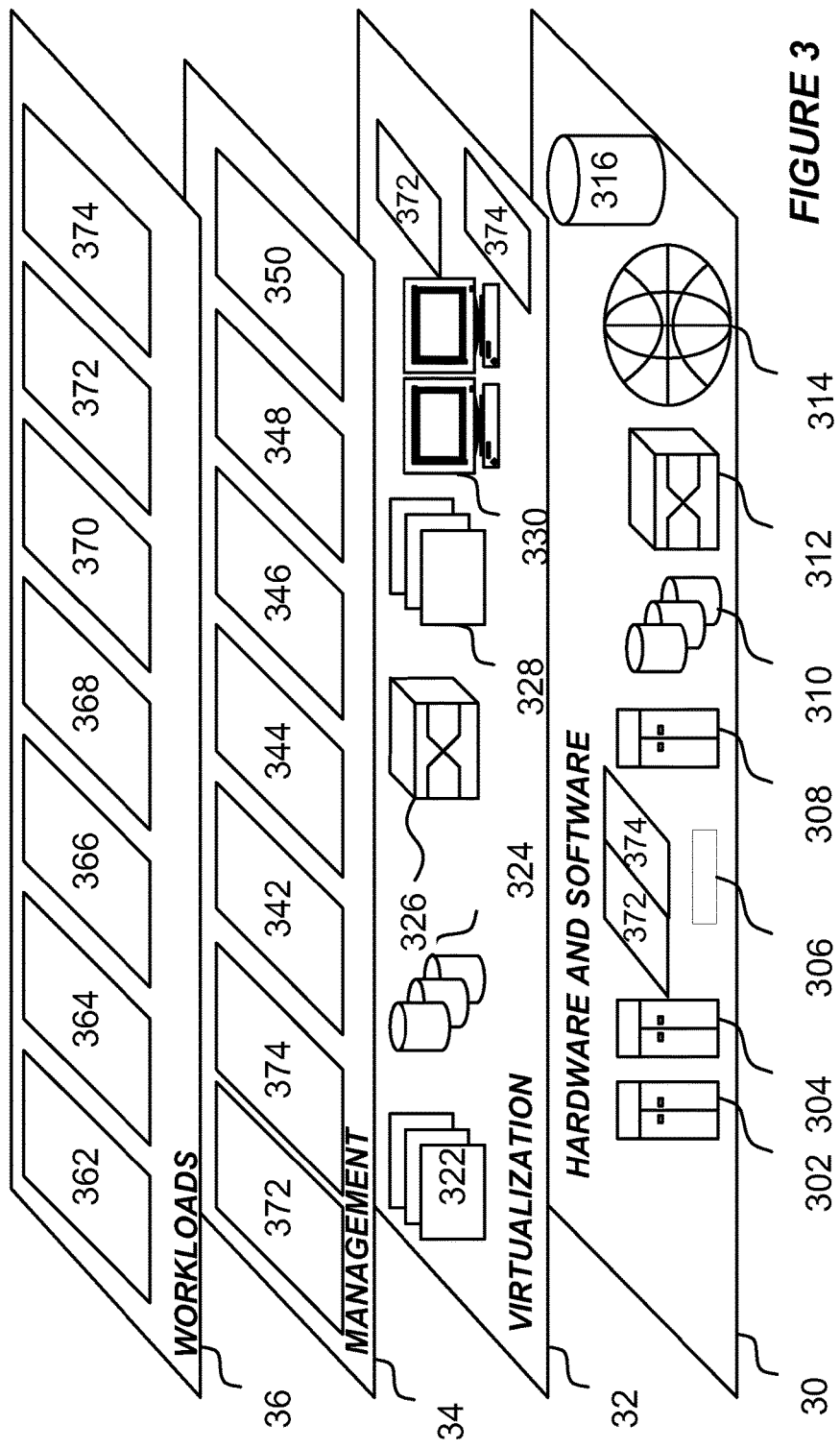
FIG. 3 is a block diagram depicting a set of functional layers provided the cloud computing environment of FIG. 2.

Referring now to FIG. 3, a set of functional abstraction layers provided by cloud computing environment 250 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 30 includes hardware and software components. Examples of hardware components include mainframes 302, in one example IBM® zSeries® systems; RISC (Reduced Instruction Set Computer) architecture based servers 304, in one example IBM pSeries® systems; IBM xSeries® systems 306; IBM BladeCenter® systems 308; storage devices 310; networks and networking components 312. Examples of software components include network application server software 314, in one example IBM WebSphere® application server software; and database software, in one example IBM DB2® database software 316.

Virtualization layer 32 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 34 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 36 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; and online transaction processing.

Figure 4:
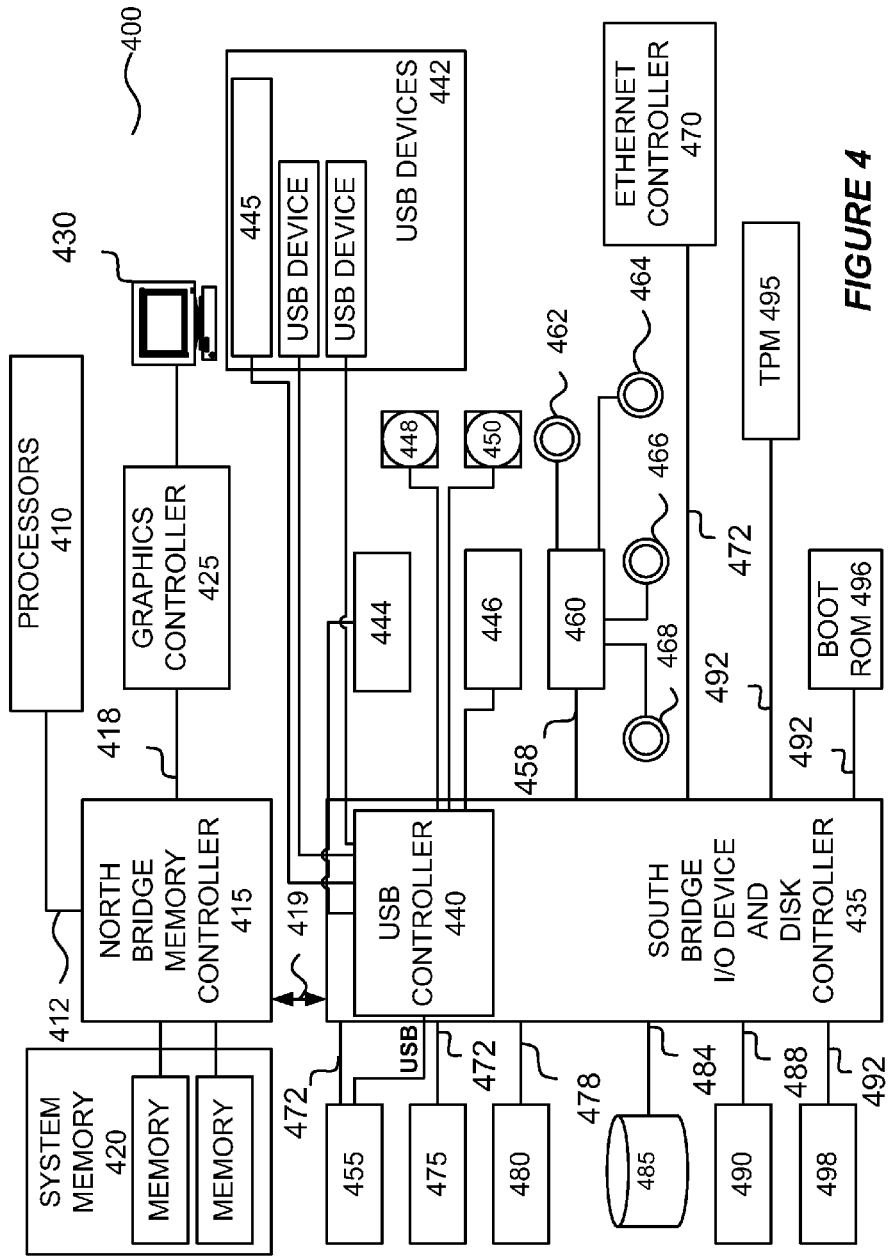
FIG. 4 is a block diagram depicting an information handling system.

FIG. 4 illustrates an information handling system 400, which is an example of a computer system capable of performing the computing operations described herein. Information handling system 400 includes one or more processors 410 coupled to processor interface bus 412. Processor interface bus 412 connects processors 410 to Northbridge 415, which is also known as the Memory Controller Hub (MCH). Northbridge 415 connects to system memory 420 and provides a means for processor(s) 410 to access the system memory 420. Graphics controller 425 also connects to Northbridge 415. In one embodiment, PCI Express bus 418 connects Northbridge 415 to graphics controller 425. Graphics controller 425 connects to display device 430, such as a computer monitor.

Northbridge 415 and Southbridge 435 connect to each other using bus 419. In one embodiment, the bus 419 is a Direct Media Interface (DMI) bus that transfers data at high speeds in each direction between Northbridge 415 and Southbridge 435. In another embodiment, a Peripheral Component Interconnect (PCI) bus connects the Northbridge 415 and the Southbridge 435. Southbridge 435, also known as the I/O Controller Hub (ICH) is a chip that generally implements capabilities that operate at slower speeds than the capabilities provided by the Northbridge 415. Southbridge 435 typically provides various busses used to connect various components. These busses include, for example, PCI and PCI Express busses, an ISA bus, a System Management Bus (SMBus or SMB), and/or a Low Pin Count (LPC) bus 492. The LPC bus often connects low-bandwidth devices, such as boot ROM 496 and "legacy" I/O devices 498 (using a "super I/O" chip). The "legacy" I/O devices 498 may include, for example, serial and parallel ports, keyboard, mouse, and/or a floppy disk controller. The LPC bus also connects Southbridge 435 to Trusted Platform Module (TPM) 495. Other components often included in Southbridge 435 include a Direct Memory Access (DMA) controller, a Programmable Interrupt Controller (PIC), and a storage device controller, which connects Southbridge 435 to nonvolatile storage device 485, such as a hard disk drive, using bus 484.

ExpressCard 455 is a slot that connects hot-pluggable devices to the information handling system. ExpressCard 455 supports both PCI Express and USB connectivity as it connects to Southbridge 435 using both the Universal Serial Bus (USB) the PCI Express bus 472. Southbridge 435 includes USB Controller 440 that provides USB connectivity to devices that connect to the USB. These devices include webcam (camera) 450, infrared (IR) receiver 448, keyboard and trackpad 444, and Bluetooth device 446, which provides for wireless personal area networks (PANs). USB Controller 440 also provides USB connectivity to other miscellaneous USB connected devices 442, such as a mouse, removable nonvolatile storage device 445, modems, network cards, ISDN connectors, fax, printers, USB hubs, and many other types of USB connected devices. While removable nonvolatile storage device 445 is shown as a USB-connected device, removable nonvolatile storage device 445 could be connected using a different interface, such as a Firewire interface, etc.

Wireless Local Area Network (LAN) device 475 connects to Southbridge 435 via the PCI or PCI Express bus 472. LAN device 475 typically implements one of the IEEE 0.802.11 standards of over-the-air modulation techniques that all use the same protocol to wirelessly communicate between information handling system 400 and another computer system or device. Optical storage device 490 connects to Southbridge 435 using Serial ATA (SATA) bus 488. Serial ATA adapters and devices communicate over a high-speed serial link. The Serial ATA bus also connects Southbridge 435 to other forms of storage devices, such as hard disk drives. Audio circuitry 460, such as a sound card, connects to Southbridge 435 via bus 458. Audio circuitry 460 also provides functionality such as audio line-in and optical digital audio in port 462, optical digital output and headphone jack 464, internal speakers 466, and internal microphone 468. Ethernet controller 470 connects to Southbridge 435 using a bus, such as the PCI or the PCI Express bus 472 (shown again). Ethernet controller 470 connects information handling system 400 to a computer network, such as a Local Area Network (LAN), the Internet, and other public and private computer networks.

While FIG. 4 shows one information handling system 400, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, automated teller machine (ATM), a portable telephone device, a communication device or other devices that include a processor and memory.

Figure 5:
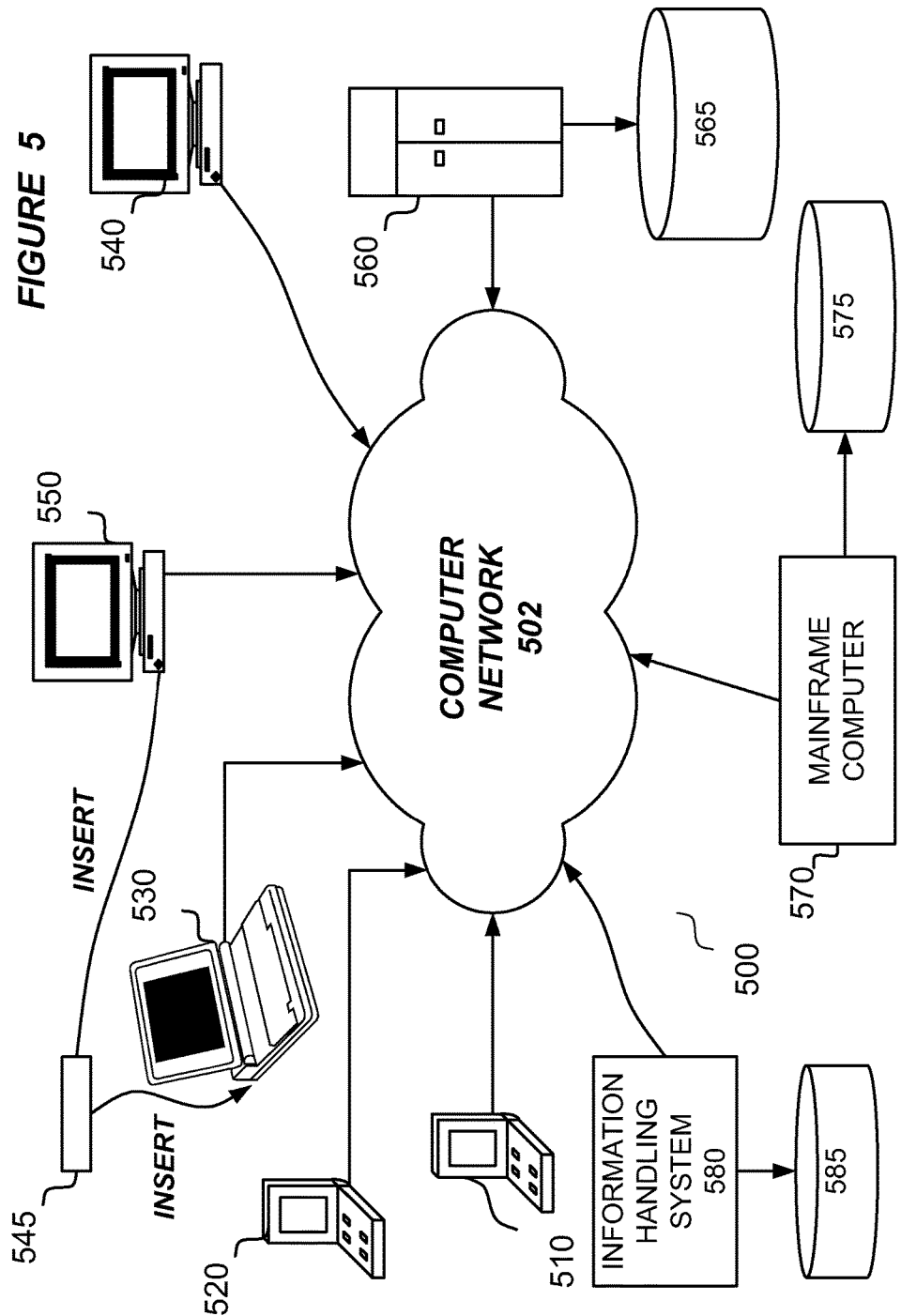
FIG. 5 is a block diagram depicting an extension of the information handling system of FIG. 4 in which a preferred embodiment of the present invention may be implemented.

FIG. 5 provides an extension of the information handling system 400 environment shown in FIG. 4 to illustrate that the methods described herein may be performed on a wide variety of information handling systems 400 that operate in a networked environment 500. Types of information handling systems 400 range from small handheld devices, such as handheld computer/mobile telephone 510 to large mainframe systems, such as mainframe computer 570. Examples of handheld computer 510 include personal digital assistants (PDAs), personal entertainment devices, such as MP3 players, portable televisions, and compact disc players. Other examples of information handling systems include pen, or tablet, computer 520, laptop, or notebook, computer 530, workstation 540, personal computer system 550, and server 560. Other types of information handling systems that are not individually shown in FIG. 5 are represented by information handling system 580. As shown, the various information handling systems may be networked together using computer network 502. Types of computer networks that may be used to interconnect the various information handling systems include Local Area Networks (LANs), Wireless Local Area Networks (WLANs), the Internet, the Public Switched Telephone Network (PSTN), other wireless networks, and any other network topology that may be used to interconnect the information handling systems. Many of the information handling systems include nonvolatile data stores, such as hard drives and/or nonvolatile memory. Some of the information handling systems shown in FIG. 5 depict separate nonvolatile data stores (server 560 utilizes nonvolatile data store 565, mainframe computer 570 utilizes nonvolatile data store 575, and information handling system 580 utilizes nonvolatile data store 585). The nonvolatile data stores may be components that are external to the various information handling systems or may be internal to one of the information handling systems. In addition, removable nonvolatile storage device 545 may be shared among two or more information handling systems using various techniques, such as connecting the removable nonvolatile storage device 545 to a USB port or other connector of the information handling systems.

One type of information handling system is an online transaction processing system. This is shown with reference to FIG. 6.

An online transaction processing system 640 is an example of a middleware application that supports many applications and operating systems. The online transaction processing system 640 provides an application program interface (API) and control resources that interact with the applications, for example security, databases, files, programs and transactions, etc. In a transaction processing system a transaction is defined as the processing initiated by a request, typically from an end user. A transaction starts, executes, and ends. A single business transaction may involve several online transaction processing applications. An application is "a collection of related programs 625, 630, 635 that together perform a business operation."

Applications may run in different geographical locations and/or run on different types of hardware. Applications may be grouped into business logic applications and presentation logic applications. Business logic applications are responsible for business calculations and updating databases. The presentation logic applications and their application interfaces control the presentation of information to end users. Presentation logic may be designed to run on a web browser of a client device.

The online transaction processing system 640 includes one or more transaction servers 675, 620 that include one or more programs 625, 630, 635 for processing specific tasks. The online transaction processing system 640 may also include one or more instances of a transaction server, each instance running software for processing user requested transactions. Each transaction server instance may be required to perform a specific task. A program may process tasks such as basic mapping support, transactions, terminals, files, transient data queues, temporary storage queues, and journals. The term transaction server has been used throughout the rest of the description but a person skilled in the art will realize that the terms transaction server and instances of a transaction server may be used interchangeably without departing from the scope of the invention.

The transaction server 620, 675 may be controlled by a main process 680. The main process 680 coordinates the parallel running of an application manager 650, listener components 655, a log manager 660, and an interval control manager 665. A running transaction server is an area of operating system memory into which system programs have been loaded (and run), with other memory allocated for each of the designated servers to use. A person skilled in the art will realize that an online transaction processing system 640 may perform many other functions which are not described here and are not deemed essential for providing the benefits of the present invention.

The application manager 650 controls the creation, running, and termination of one or more of the transaction servers 675, 620. A transaction server may be dedicated to the task of processing applications, for example. This type of transaction server is typically called an application transaction server. The application manager 650 controls a pool of application transaction servers. The application manager 650 monitors a shared memory queue 615 for transactions to be started and for new transactions waiting for an available application transaction server. If an application transaction server is available, the application manager 650 runs the transaction on the application transaction server. If there is no available application transaction server and the maximum number has not been reached, the application manager 650 creates a new application transaction server to run the transaction.

The listener component 655 monitors incoming remote procedure call requests. If the listener component 655 detects an incoming transaction request, it places the request in the shared memory queue 615 monitored by the application manager 650.

The log manager 660 writes checkpoint data to a region log. The data is used to minimize restart time and to help diagnose problems.

The interval control manager 665 enables the starting of user and system transactions at user-specified times. When a time-triggered request occurs, the interval control manager 665 adds the transaction request to the shared memory queue 615 monitored by the application manager 650.

When a user application 600 requests a transaction 605 (e.g., TXN1) in an online transaction processing system 640, the request is typically passed to a receiving transaction server 675 for processing.

The receiving transaction server 675 verifies that it can communicate with the user's application and that the user is authorized to access the resources located on the receiving transaction server.

The receiving transaction server 675 searches a table of transaction definitions for information about the transaction. It should be noted that before a transaction may be used, it must be defined with attributes such as the name of the first program to be run when the transaction is requested.

If a transaction definition exists, the receiving transaction server 675 assigns the request to a task 610 that it uses to control the processing of the transaction's programs 625, 630, 635. The receiving transaction server 675 schedules the task 610 to be processed with other tasks and allocates processing time and access to the required data.

The task 610 runs the transaction's first program 625. If the transaction is implemented by several programs 630, 635, those programs may run on the same or separate transaction servers 620.

The receiving transaction server 675 monitors the progress of the task 610, serving its requests for data, communications, and other resources. The receiving transaction server 675 also performs background operations needed to ensure that the task continues to run optimally, without conflict with other tasks and with the data integrity required.

When the task 610 completes, the receiving transaction server 675 commits any data changes, terminates the task, and frees resources for use by other transactions.

Typically, a user is required to authenticate each time the application is processed by a different program and/or transaction server. To implement single sign on for the validity of a transaction or the validity of a user's transaction session, the present invention provides for creating read-only data objects of security information and allowing transaction servers and programs to access the read-only data object(s) via a secure transaction channel for sharing trusted information and establishing a trusted relationship among at least two transaction servers in a transaction processing system.

Trusted information is exchanged between transaction servers by the means of security tokens. One such security token is a Security Assertion Markup Language (SAML) token, for example. A SAML token comprises a SAML assertion. The SAML assertion comprises statements in XML comprising security data associated with a user.

A security token is issued by an identity provider associated with a particular security domain. Thus, any of the transaction servers located in the security domain may use authorization attributes contained within the security token to authorize the user. The security token is signed by a signing authority, typically, an identity provider. The security token is issued and signed by the signing authority when the user initiates a transaction.

Figure 7:
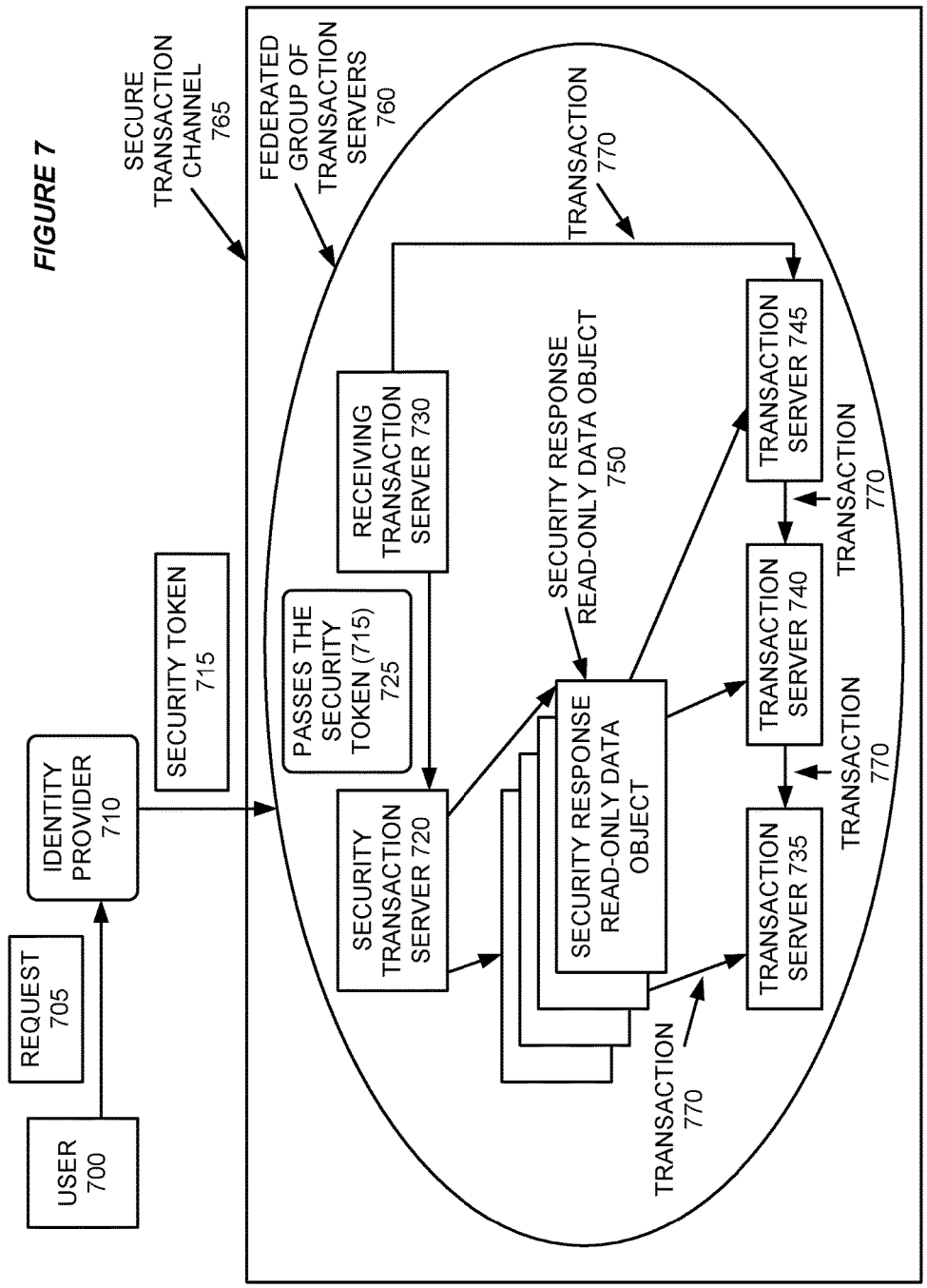
FIG. 7 is a block diagram illustrating a federation of transaction servers as improved by a preferred embodiment of the invention.
Figure 8:
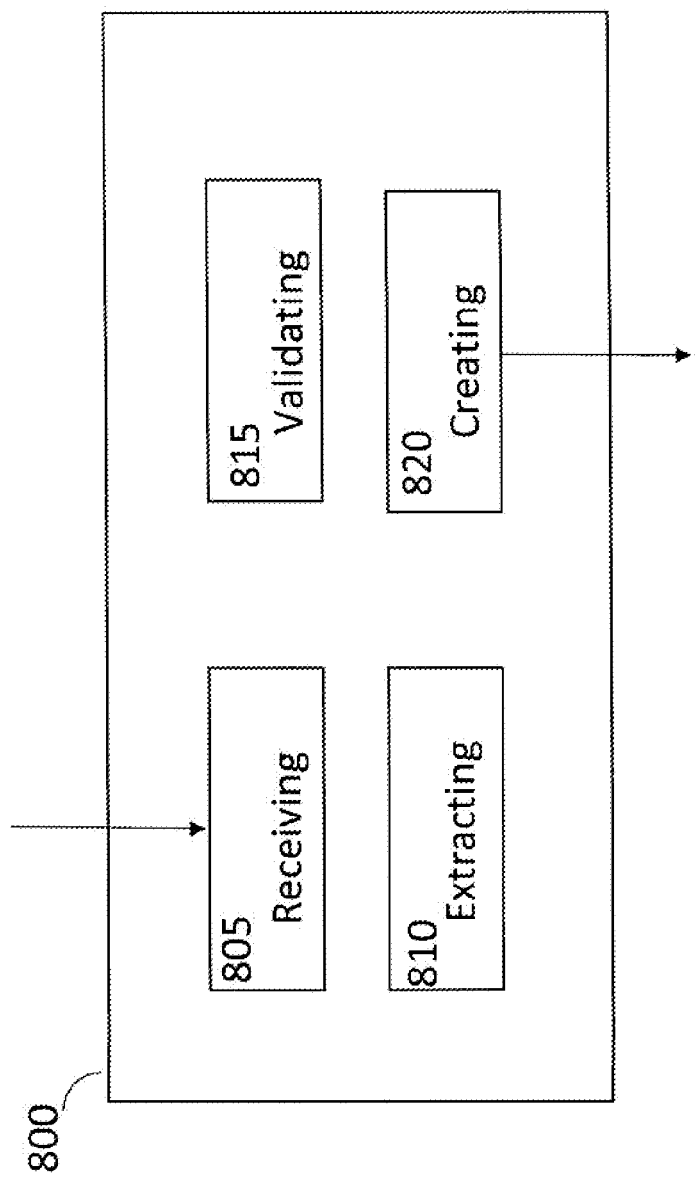
FIG. 8 is a block diagram illustrating the security processing module in accordance with a preferred embodiment of the present invention.
Figure 9:
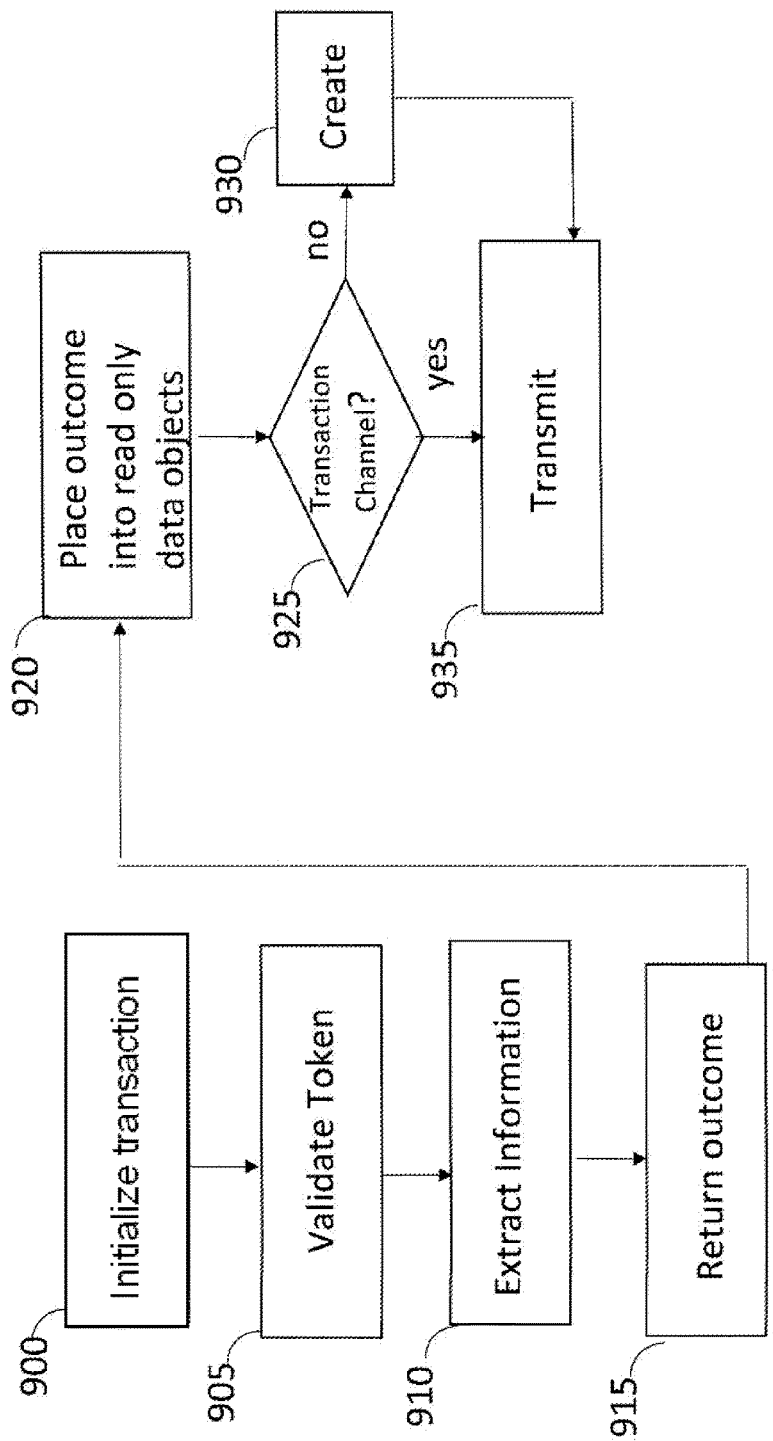
FIG. 9 is a flow diagram illustrating the process steps of a preferred embodiment of the present invention.

With reference to FIG. 7, FIG. 8, and FIG. 9, a federated group of transaction servers 760 is shown. A federated group of transaction servers 760 provide a collaborative environment for processing online transaction requests. A federated group of transaction servers 760 establish a trust relationship that allows each of the transaction servers 730, 720, 735, 740, and 745 to trust security information exchanged between them.

A transaction sever 720, 730, 735, 740, and 745 in the federated group of transactions servers 760, include additional logic components for interacting and cooperating with each other to provide the benefits of the present invention. In a preferred embodiment, a security processing module 800 is provided that includes a receiving component 805 for receiving a security token associated with a transaction request, an extracting component 810 for extracting security information from the received security token, a validating component 815 for validating the security information and placing an outcome of the validation of the extracted information and preferably the outcome of the validation of the security token into the read-only data objects, and a creating component 820 for determining if a secure transaction channel exists and if a negative determination is made for creating a secure transaction channel to allow the distribution and access of the read-only data objects by other programs operating on transaction severs. The security processing module 800 may reside on any transaction server 730, 720, 735, 740, and 745. However, in a preferred embodiment the security processing module 800 resides on a transaction server that is responsible for processing authorization and authentication information. The security processing module 800 interfaces with the main process 680 of FIG. 6.

In a preferred embodiment, a secure transaction channel 765 is a type of data object containing a collection of one or more data objects called containers 750. A data object 750 is a managed storage area that may hold any form of application data. A data object 750 may be any size and may hold data in any format that the application requires. An application may reference any number of data objects 750.

The secure transaction channel 765 includes an application programming interface that associates the secure transaction channel 765 with a collection of one or more data objects 750. The data objects 750 are shared with programs and/or transaction servers across the secure transaction channel 765.

Preferably, the secure transaction channel 765 is an area of memory. The area of memory may be a shared area of memory. The area of memory may be accessed by an inter-memory link (and for example, requiring communication to take place using a secure service route and to specifically authorize the next processing transaction server), a communication link for example hypertext transfer protocol secure (HTTPS), or a pointer to an address space. If the transaction servers 720, 730, 735, 740, and 745 are operating on a different physical machine, the secure transaction channel 765 may be provided by an Internet protocol (IP) connection secured by a secure socket layer protocol, for example. The secure transaction channel 765 may be implemented in a transport layer of the Open Systems Interconnection (OSI) model, for example. This means that the data object 750 or a pointer to the data object 750 is passed in such a way that is hidden to a program, whenever a program links to another program on another transaction server 735, 740, and 745. A user 700, via their user operated device, sends a request 705 to access a service. The user operated device connects to an identity provider 710 and the identity provider 710 issues a security token 715.

Figure 6:
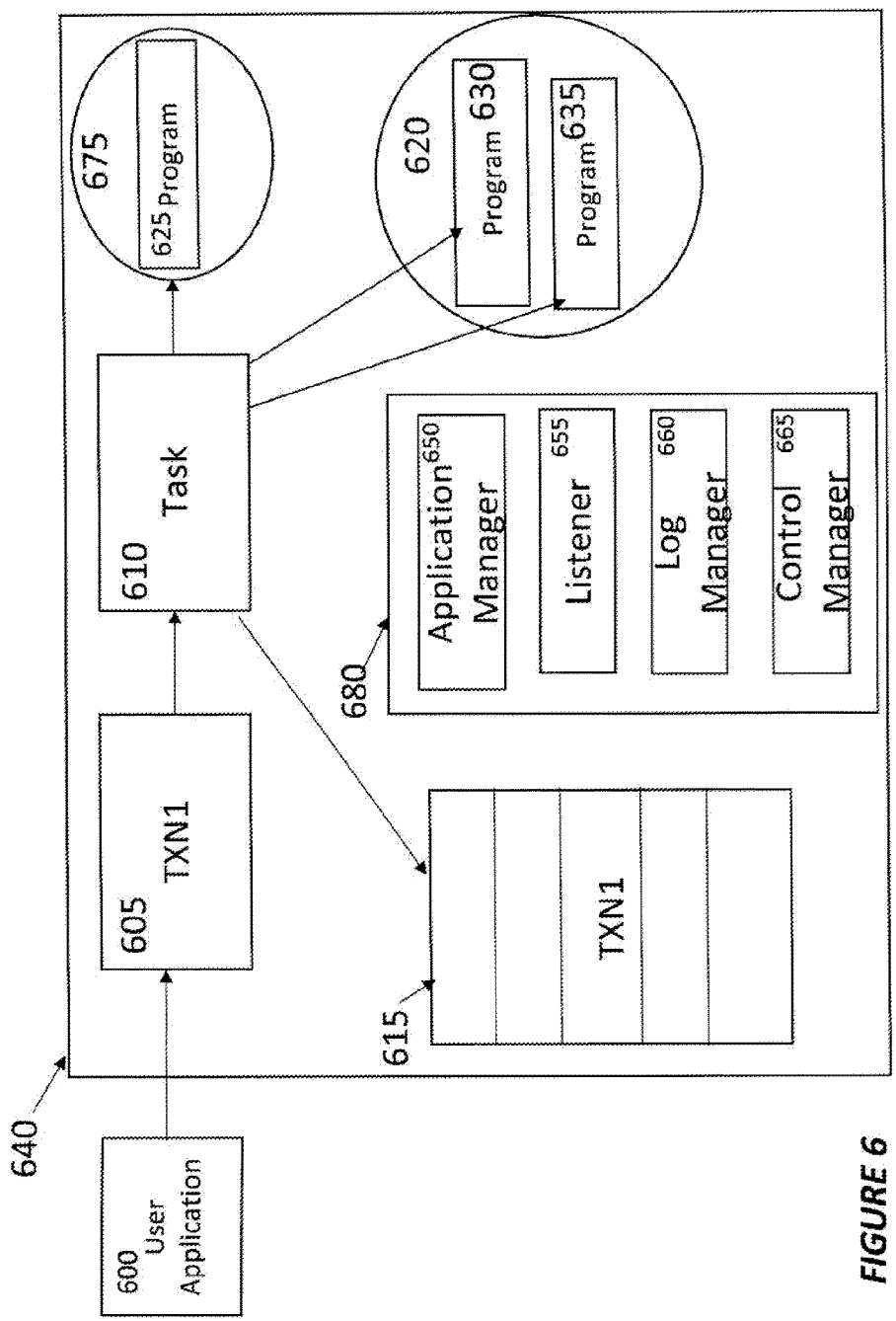
FIG. 6 is a block diagram illustrating an online transaction processing system.

The security token 715 and other transaction information is passed to a receiving transaction server 730 for initializing the requested transaction (step 900) as explained with reference to FIG. 6. The receiving transaction server 730 passes 725 the security token 715 to a security transaction server 720 for validating the security token 715 (step 905). If the security token 715 is validated, an extractor component extracts security information from the security token 715 (step 910). The security transactions server 720 returns an outcome of the validation of the security token and other security information in a security response read-only data object 750 (step 915). The outcome of the validation is one or more validation attributes that state if the user is authorized to access the requested service. A set of validation attributes may include at least one validation attribute. The outcome of the validation is placed into the read-only data object 750 (step 920).

In another embodiment, the receiving transaction server 730 and the security server 720 may be operating on the same physical machine.

A determination may be made to determine (step 925) if a secure transaction channel exists. If the determination is positive the read-only data object 750 is placed on the secure transaction channel 765 and the read-only data object 750 is shared by transaction servers 735, 740, and 745 and programs throughout the processing of the transaction 770 (step 935). If the determination is negative, the secure transaction channel 765 is created (step 930) and the read-only data object 750 is placed on the secure transaction channel 765 and shared by transaction servers 735, 740, and 745 and programs throughout the processing of the transaction 770.

The read-only data object 750 on the secure transaction channel 765 is transmitted to, for example, an application transaction server 735, 740, and 745 for continued processing of the transaction 770.

The application transaction server 735, 740, and 745 implementing the requested service reads from the secure transaction channel 765 the validated token contained within the read-only data object 750, to retrieve authorization information and provide the required services.

Alternatively, if the secure transaction channel 765 is an area of memory, the data object 750 may be stored in the area of memory and a pointer to the area of memory may be passed to the transaction sever, for example an application transaction server.

The read-only data object 750 may be stored in a secure cache. The storing of the data object in the secure cache enables the read-only data object 750 to be reused by a security server in order to bypass the expense of validation processes for subsequent requests using the same security token. An assertion identifier may be used to compare received security tokens with the cached security token. A time period in which the data objects stored in the cache are valid may be configurable. Storing the read-only data object 750 in a secure cache extends the validity of the security token for multiple transactions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

IBM® and other registered are registered trademark of International Business Machine Corporation registered in many jurisdictions worldwide or other third parties trademarks registered in many jurisdictions worldwide.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for implementing single sign-on in a transaction processing system, the method comprising:
    at a security transaction server that authenticates transaction requests for a group of transaction servers:
        receiving a security token extracted from a transaction request;
        validating the security token and, in response to a positive validation, extracting security information from the security token;
        processing the security information against a table of authorized transaction definitions to validate the transaction request and, responsive to validating that an authorized transaction definition of the transaction request is defined within the table of authorized transaction definitions, generating according to information within the authorized transaction definition a set of validation attributes that specify (i) a designated transaction server and (ii) a name of a designated program to be run to fulfill the transaction request;
        storing the validated security token with the set of validation attributes in a read-only data object within a secure transaction channel accessible by the designated transaction server; and
        notifying the designated transaction server specified within the set of validation attributes of the read-only data object, where the read-only data object with the set of validation attributes within the secure transaction channel distributes confirmation of completion of security validation for processing of the transaction request by the designated transaction server using the validated security token contained within the read-only data object.

2. The method of claim 1, where the validated security token and the set of validation attributes stored in the read-only data object are authorized to be accessed by the designated transaction server and are hidden from the named designated program whenever the named designated program links to another program on another transaction server within the group of transaction servers, and where notifying the designated transaction server specified within the set of validation attributes of the read-only data object comprises transmitting the read-only data object to the designated transaction server within the secure transaction channel.

3. The method of claim 2, where the secure transaction channel implements a secure network protocol.

4. The method of claim 1, where:
    storing the validated security token with the set of validation attributes in the read-only data object within the secure transaction channel accessible by the designated transaction server comprises storing the read-only data object within a secure shared area of memory that implements the secure transaction channel and that is accessible by the designated transaction server using a secure inter-memory link; and notifying the designated transaction server specified within the set of validation attributes of the read-only data object comprises transmitting a pointer to the secure shared area of memory that implements the secure transaction channel to the designated transaction server for accessing the read-only data object by the designated transaction server using the secure inter-memory link to process the transaction request.

5. The method of claim 1, where notifying the designated transaction server specified within the set of validation attributes of the read-only data object comprises determining if the secure transaction channel exists and in response to a negative determination, creating the secure transaction channel for transmitting the read-only data object or passing a pointer to an address of the read-only data object to the designated transaction server.

6. The method of claim 1, further comprising caching the read-only data object in a secure cache within the secure transaction channel implemented as a secure shared area of memory accessible by the designated transaction server using an application programming interface (API), where caching the read-only data object in the secure cache extends validity of the security token for multiple transaction requests, and further comprising the security transaction server reusing the read-only data object for validating a subsequent additional transaction request without an additional sequence of validation processes.

7. The method of claim 6, further comprising assigning the read-only data object a time period in which the read-only data object is valid within the secure cache, where the time period is configurable.

8. The method of claim 1, where the security token is a security assertion markup language (SAML) token.

9. The method of claim 1, where the method steps are performed in a cloud computing environment.

10. The method of claim 1, further comprising:
determining that the transaction request involves multiple transaction servers;
where the generated set of validation attributes stored in the read-only data object specify a set of designated transaction servers and a name of each designated program to be run at each of the set of designated transaction servers to fulfill the transaction request;
where the set of validation attributes stored in the read-only data object specifically authorize a first designated transaction server of the set of designated transaction servers to access the read-only data object using the secure transaction channel and process a first portion of the transaction request; and
further comprising authorizing a next designated transaction server of the set of designated transaction servers to access the read-only data object using the secure transaction channel and process a next portion of the transaction request.

11. An apparatus for implementing single sign-on in a transaction processing system, the apparatus comprising:
a communication interface; and
a processor, implemented as a security transaction server that authenticates transaction requests for a group of transaction servers, programmed to:
receive, over the communication interface, a security token extracted from a transaction request;
validate the security token and, in response to a positive validation, extract security information from the security token;
process the security information against a table of authorized transaction definitions to validate the transaction request and, responsive to validating that an authorized transaction definition of the transaction request is defined within the table of authorized transaction definitions, generate according to information within the authorized transaction definition a set of validation attributes that specify (i) a designated transaction server and (ii) a name of a designated program to be run to fulfill the transaction request;
store the validated security token with the set of validation attributes in a read-only data object within a secure transaction channel accessible by the designated transaction server; and
notify the designated transaction server specified within the set of validation attributes of the read-only data object, where the read-only data object with the set of validation attributes within the secure transaction channel distributes confirmation of completion of security validation for processing of the transaction request by the designated transaction server using the validated security token contained within the read-only data object.

12. The apparatus of claim 11, where the validated security token and the set of validation attributes stored in the read-only data object are authorized to be accessed by the designated transaction server and are hidden from the named designated program whenever the named designated program links to another program on another transaction server within the group of transaction servers, and where, in being programmed to notify the designated transaction server specified within the set of validation attributes of the read-only data object, the processor is programmed to transmit the read-only data object to the designated transaction server within the secure transaction channel.

13. The apparatus of claim 12, where the secure transaction channel implements a secure network protocol.

14. The apparatus of claim 11, where:
in being programmed to store the validated security token with the set of validation attributes in the read-only data object within the secure transaction channel accessible by the designated transaction server, the processor is programmed to store the read-only data object within a secure shared area of memory that implements the secure transaction channel and that is accessible by the designated transaction server using a secure inter-memory link; and
in being programmed to notify the designated transaction server specified within the set of validation attributes of the read-only data object, the processor is programmed to transmit a pointer to the secure shared area of memory that implements the secure transaction channel to the designated transaction server for accessing the read-only data object by the designated transaction server using the secure inter-memory link to process the transaction request.

15. The apparatus of claim 11, where, in being programmed to notify the designated transaction server specified within the set of validation attributes of the read-only data object, the processor is programmed to determine if the secure transaction channel exists and in response to a negative determination, create the secure transaction channel for transmitting the read-only data object or passing a pointer to an address of the read-only data object to the designated transaction server.

16. The apparatus of claim 11, further comprising a secure cache for storing the read-only data object in the secure cache and where the processor is programmed to cache the read-only data object in the secure cache within the secure transaction channel implemented as a secure shared area of memory accessible by the designated transaction server using an application programming interface (API), where caching the read-only data object in the secure cache extends validity of the security token for multiple transaction requests, and where the processor is further programmed to reuse the read-only data object for validating a subsequent additional transaction request without an additional sequence of validation processes.

17. The apparatus of claim 16, where the processor is further programmed to assign the read-only data object a time period in which the read-only data object is valid within the secure cache, where the time period is configurable.

18. The apparatus of claim 11, where the processor is further programmed to:
    determine that the transaction request involves multiple transaction servers;
    where the generated set of validation attributes stored in the read-only data object specify a set of designated transaction servers and a name of each designated program to be run at each of the set of designated transaction servers to fulfill the transaction request;
    where the set of validation attributes stored in the read-only data object specifically authorize a first designated transaction server of the set of designated transaction servers to access the read-only data object using the secure transaction channel and process a first portion of the transaction request; and
    where the processor is further programmed to authorize a next designated transaction server of the set of designated transaction servers to access the read-only data object using the secure transaction channel and process a next portion of the transaction request.

19. A computer program product, comprising:
    a computer readable storage medium having computer readable program code embodied therewith, where the computer readable storage medium is not a transitory signal per se and where the computer readable program code when executed on a computer configured as a security transaction server that authenticates transaction requests for a group of transaction servers causes the computer to, as part of implementing single sign-on in a transaction processing system:
        receive a security token extracted from a transaction request;
        validate the security token and, in response to a positive validation, extract security information from the security token;
        process the security information against a table of authorized transaction definitions to validate the transaction request and, responsive to validating that an authorized transaction definition of the transaction request is defined within the table of authorized transaction definitions, generate according to information within the authorized transaction definition a set of validation attributes that specify (i) a designated transaction server and (ii) a name of a designated program to be run to fulfill the transaction request;
        store the validated security token with the set of validation attributes in a read-only data object within a secure transaction channel accessible by the designated transaction server; and
        notify the designated transaction server specified within the set of validation attributes of the read-only data object, where the read-only data object with the set of validation attributes within the secure transaction channel distributes confirmation of completion of security validation for processing of the transaction request by the designated transaction server using the validated security token contained within the read-only data object.

20. The computer program product of claim 19, where the validated security token and the set of validation attributes stored in the read-only data object are authorized to be accessed by the designated transaction server and are hidden from the named designated program whenever the named designated program links to another program on another transaction server within the group of transaction servers, and where, in causing the computer to notify the designated transaction server specified within the set of validation attributes of the read-only data object, the computer readable program code when executed on the computer causes the computer to transmit the read-only data object to the designated transaction server within the secure transaction channel.

21. The computer program product of claim 19, where:
    in causing the computer to store the validated security token with the set of validation attributes in the read-only data object within the secure transaction channel accessible by the designated transaction server, the computer readable program code when executed on the computer causes the computer to store the read-only data object within a secure shared area of memory that implements the secure transaction channel and that is accessible by the designated transaction server using a secure inter-memory link; and
    in causing the computer to notify the designated transaction server specified within the set of validation attributes of the read-only data object, the computer readable program code when executed on the computer causes the computer to transmit a pointer to the secure shared area of memory that implements the secure transaction channel to the designated transaction server for accessing the read-only data object by the designated transaction server using the secure inter-memory link to process the transaction request.

22. The computer program product of claim 19, where, in causing the computer to notify the designated transaction server specified within the set of validation attributes of the read-only data object, the computer readable program code when executed on the computer causes the computer to determine if the secure transaction channel exists and in response to a negative determination, create the secure transaction channel for transmitting the read-only data object or passing a pointer to an address of the read-only data object to the designated transaction server.

23. The computer program product of claim 19, where the computer readable program code when executed on the computer further causes the computer to cache the read-only data object in a secure cache within the secure transaction channel implemented as a secure shared area of memory accessible by the designated transaction server using an application programming interface (API), where caching the read-only data object in the secure cache extends validity of the security token for multiple transaction requests, and where the computer readable program code when executed on the computer further causes the computer to reuse the read-only data object for validating a subsequent additional transaction request without an additional sequence of validation processes.

24. The computer program product of claim 23, where the computer readable program code when executed on the computer further causes the computer to assign the read-only data object a time period in which the read-only data object is valid within the secure cache, where the time period is configurable.

25. The computer program product of claim 19, where the computer readable program code when executed on the computer further causes the computer to:
   determine that the transaction request involves multiple transaction servers;
   where the generated set of validation attributes stored in the read-only data object specify a set of designated transaction servers and a name of each designated program to be run at each of the set of designated transaction servers to fulfill the transaction request;
   where the set of validation attributes stored in the read-only data object specifically authorize a first designated transaction server of the set of designated transaction servers to access the read-only data object using the secure transaction channel and process a first portion of the transaction request; and
   where the computer readable program code when executed on the computer further causes the computer to authorize a next designated transaction server of the set of designated transaction servers to access the read-only data object using the secure transaction channel and process a next portion of the transaction request.

* * * * *